Jan. 28, 1969    M. J. OAKLEY ET AL    3,424,623
BLOW MOLDED BATTERY

Filed June 28, 1966    Sheet 1 of 3

Michael J. Oakley,
Monica V. Oakley,
INVENTORS.
BY

Golove & Kleinberg,
ATTORNEYS.

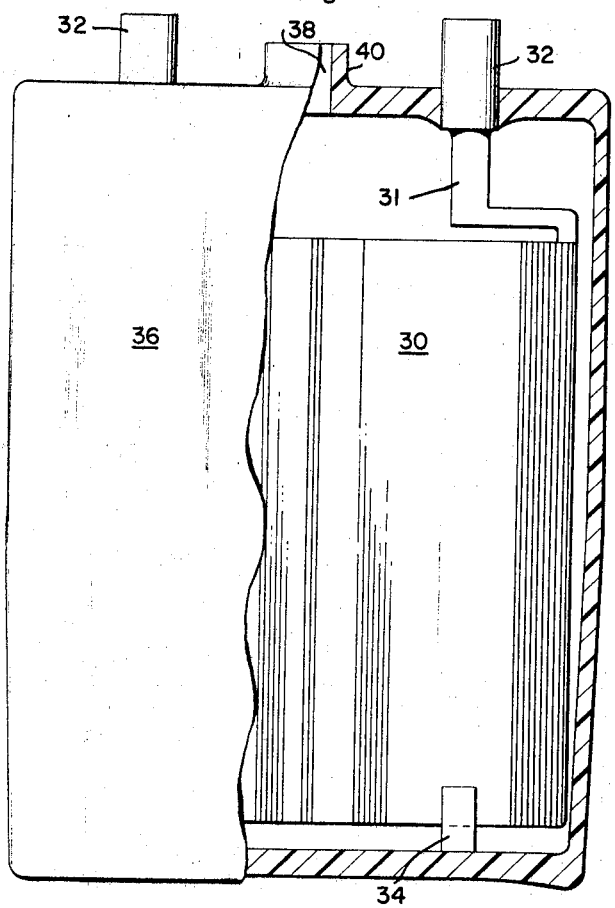
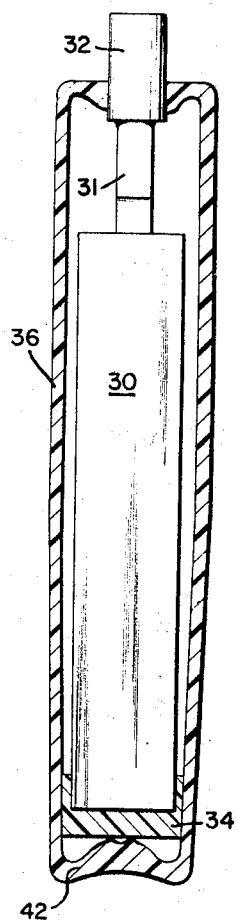
Fig. 5.
Fig. 6.
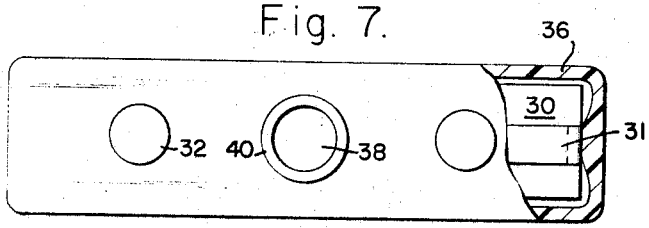
Fig. 7.
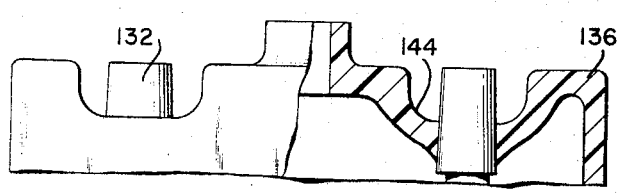
Fig. 8.

United States Patent Office 3,424,623
Patented Jan. 28, 1969

3,424,623
BLOW MOLDED BATTERY
Michael J. Oakley, and Monica V. Oakley, both of 5536 Sierra Vista, Los Angeles, Calif. 90038
Filed June 28, 1966, Ser. No. 561,249
U.S. Cl. 136—176     1 Claim
Int. Cl. H01m *1/00;* B29c *17/07*

ABSTRACT OF THE DISCLOSURE

A battery is fabricated by blow molding a case around the several cells comprising the battery, to provide a unitary, integral case and cover.

---

This invention relates to blow molding of plastics and more particularly, to a process for producing a container with an object internally contained, with both object and container being an integral whole. This invention also relates to a product capable of being manufactured thereby, such as an electric battery, having a blow-molded case forming an integral part thereof.

The process of blow molding hollow articles from plastic materials has attained a position of significance in the container market. Blow molding is used, for example, to produce the now familiar detergent and bleach bottles. Many hollow plastic toys are produced by blow molding, and the process is also being directed to still other industrial applications which include automotive parts, housewares, and larger containers such as oil drums, beer kegs and waste receptacles.

As indicated above, the blow molding process is well known in the prior art and is described, for example, in Patents No. 2,724,860 isued Nov. 29, 1955, No. 2,854,691 issued Oct. 7, 1958, and No. 3,163,690 issued Dec. 29, 1964. The process consists esentially of placing a "bubble" of softened plastic material within a mold and blowing it into the configuration of the mold, as was done in the glass blowing arts. The article produced by the process is then a hollow shell having an opening. This opening is provided to admit the blowing fluid to the interior of the plastic within the mold, and it may take the form of the mouth of a bottle or may be one or more small holes left by "blow pins."

The products which can be manufactured according to the prior art are restricted to hollow shells. The invention described herein adds a new dimension to conventional blow molding, and permits the blow molding process to be utilized to enclose an object within a container. The container is blow molded about an object which is situated within the mold, and, after formation of the container, the object and container comprise integral parts of a whole.

The position of the object may be spatially fixed with respect to the container, and spacers and support members may be positioned between the object and the interior walls of the container to accomplish this purpose. Such spacers and support members may be blow molded as part of the container through suitable mold design, or they may be inserted between the object and the mold cavity walls prior to the molding step of the process. In the latter case, these members may be made of a material which is compatible to the plastic tubing so that they will weld to the container produced. In either case, the resiliency of these plastic members will aid in the absorption of mechanical disturbances which would otherwise be transmitted from the container to the object.

In a preferred application of this process, an electric storage battery is produced whose case is blow molded about the interior parts of the battery cells. Battery cases heretofore constructed consist of a "wide mouthed" container having a bottom and substantially vertical lateral walls; another separate part is the cover or top of the battery cell. After these parts are formed, the battery cell plates are inserted within the container, and the top is set into place. This top must then be sealed to the walls of that container and to the cell terminals, either by some suitable sealing compound or by mechanical interlocking of parts, or by a combination of the two. In any event, the joints produced are subject to opening under the strain of use and may allow acid to escape which will cause deterioration of the cells and injury to any parts which the acid may contact. A plurality of cells are then joined to produce a battery. Alternatively, a battery case may be formed with internal partitions to separate the cells and a plurality of covers are then affixed to complete the battery.

These disadvantages are overcome by the battery produced in accordance with the method of the present invention, in that a battery cell case is formed in one piece about the battery plates, and the cell case and battery plates, together with the extending terminals, are therefore integral parts of a single unit or battery cell. The cells can then be interconnected to form a battery.

Since no case parts are required to be joined, there are, of course, no joints which can open. Furthermore, the storage battery cell produced by this method is characterized by its light weight, permitting its use where weight considerations are critical, and further allowing decreased transportation expenses. Additional economy is provided by its low cost of construction, and the absence of joints provide substantial immunity to case failure, thereby extending its useful service life.

The novel features which are believed to be characteristic of the invention, both as to the method and the products produced thereby, will be better understood from the following description considered in connection with the accompanying drawings in which certain preferred embodiments are illustrated by way of example. It is expressly understood, however, that the drawings are for the purpose of illustration and description only and are not intended as a definition of the limits of the invention.

FIG. 5 is a front view of a preferred embodiment of the product produced by the process of the present invention, shown partly with the front portion of the case removed, this embodiment being an electric storage battery cell;

FIG. 6 is a side sectional view of the electric storage battery cell of FIG. 5, viewed along the line 6—6 in the direction of the appended arrows;

FIG. 7 is a top view of the electric storage battery cell of FIG. 5, shown partly with the top portion of its case removed;

FIG. 8 is a front view of an alternative embodiment of the top portion of the battery cell of the preferred embodiment of FIG. 5;

Figure 1:
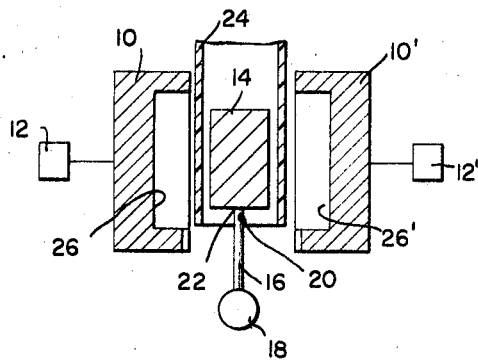
FIG. 1 is a diagrammatic representation of a part of a machine practicing the process according to the present invention.

With reference to the drawings, there is shown in FIG. 1 a cross-sectional view of apparatus and materials which may be used to practice the process according to the present invention. A blow molding machine having a two-part mold may be employed, as indicated by the mold parts 10, 10' shown in an open position. The mold parts 10, 10' may be closed and opened by suitable means such as opposing pistons 12, 12'. An object 14 which is to be enclosed in a case or container is suitably supported between the mold parts 10, 10'. Apparatus is provided to introduce a "blowing fluid" into the chamber which results when the mold parts 10, 10' are closed, for example a blow pin 16 which is connected to a controlled source 18 of blowing fluid such as air. The object 14 may be supported by the blow pin 16, in which case apertures 20 are provided through the walls of the blow pin 16 near its closed end 22.

When it is desired to blow mold a container about an object 14, the mold parts 10, 10' are in an open position as shown in FIG. 1. A tube of softened (hot) plastic, or a "parison" 24, is lowered about the object 14 and between the mold parts 10, 10'. The mold parts 10, 10' are then closed upon being activated by the pistons 12, 12', thereby trapping a portion of the parison 24 within the mold cavity. Air or other fluid is then introduced into the mold cavity by means of the blow pin 16, and the pressure so produced within the cavity upon the parison 24 causes the hot plastic material to bear against and conform to the interior walls 26, 26' of the mold parts 10, 10'. When the plastic has hardened and become rigid by cooling, the mold parts 10, 10' are opened and the product may be removed. The product consists of the object 14 enclosed in a plastic case or container which has been molded from the material of the parison 24.

Figure 3:
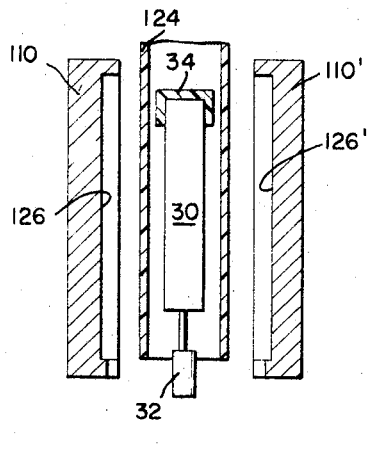
FIG. 3 is a sectional view of the cell molding apparatus of FIG. 2 taken along the line 3—3 in the direction of the appended arrows.
Figure 4:
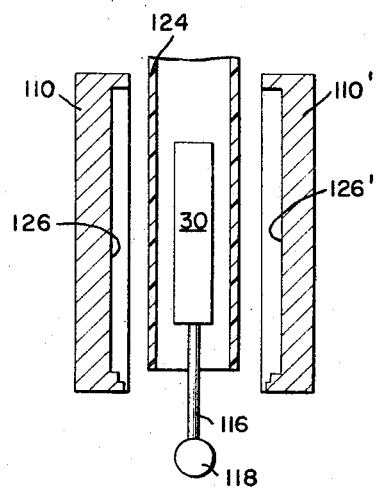
FIG. 4 is a sectional view of the apparatus of FIG. 2 taken along the line 4—4 in the direction of the appended arrows.
Figure 2:
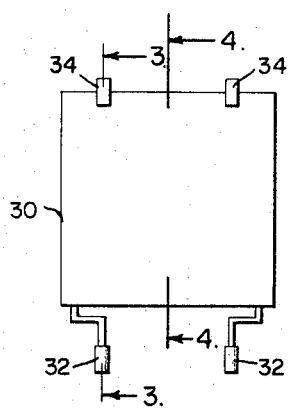
FIG. 2 is a front view of the plates of an electric storage battery cell, inverted to have a container formed about it by the process according to the present invention.

FIGS. 2, 3 and 4 may be considered together in order to more fully describe the process as applied to the encasing of electric storage battery cell plates. In FIG. 2 there is shown an electric storage cell assembly 30 before a case has been blow molded around it. The cell assembly 30 is shown in an inverted position, this position being advantageous in the blow molding process so that battery cell terminals 32 may be employed to support the assembly. Spacers 34 are included at the bottom and to the front and rear faces of the cell assembly 30.

FIG. 3 shows the cell assembly 30 positioned between mold parts 110, 110', just prior to the closing thereof. The cross-section of the parison 124 in FIGS. 3 and 4, is rectangular in shape, approximately conforming to the lateral cross-section of the mold cavity. The cell assembly 30 is positioned between the mold parts 110, 110' such that the terminals 32 extend below the bottom portion of the mold, as shown in FIG. 3. This extension allows the terminals 32 to be gripped by a device located outside of the mold, in order to support the assembly 30.

Looking again to FIG. 4, upon closing the mold parts 110, 110', air is let into the mold cavity by means of the blow pin 116 which is connected to a controlled source 118 of air or other fluid. The pressure produced thereby causes the hot plastic to conform to the interior walls 126, 126' of the mold parts 110, 110'.

The preferred embodiment of the product produced by the process described in FIGS. 2, 3 and 4, is shown in FIGS. 5, 6 and 7. The latter figures show a cell assembly 30 within a case 36, except for the protruding terminals 32, the cell assembly and case forming integral parts of the product. The preferred embodiment is provided with an aperture 38 surrounded by an extension 40 of the case 36. This aperture 38 remains from that portion of the process described in FIG. 4, and allows insertion of the blow pin 116 into the mold cavity.

Returning to FIG. 5, the electric cell may be activated by introduction of an electrolyte into the case 36 through the aperture 38. The case is then sealed by insertion of a plug into the space formed by the extension 40, or by a cap about the exterior portion of the extension 40. Alternatively, the interior or exterior surfaces of the extension 40 may be threaded, and the case 36 may be sealed by means of a threaded plug or a threaded cap.

The cell assembly 30 is supported in the case 36 by means of physical contact with the case at the terminals 32 and at the spacers 34. The spacers 34 serve the additional purpose of raising the battery 30 above the bottom of the case 36, allowing the electrolyte to flow within and about the cells of the battery 30. The spacers 34 may be made of a material compatible with the plastic material forming the case 36, so that the spacers 34 will be welded to the case 36. The bottom of the spacers 34 are in contact with an increased thickness 42 along the bottom of the case 36. This increased thickness 42 results from an overlapping and welding of plastic material, at the seams of the mold, during the blow molding process. The thickness of the container wall may be controlled by known techniques, during the blow molding operation.

In FIG. 8 there is shown an alternative embodiment of the invention of FIG. 5. Here a battery case 136 provides cups 144 about terminals 132, permitting a different type of connector to be attached to the terminals 132 than would be attached to the terminals 32 of the embodiment of FIG. 5.

Figure 9:
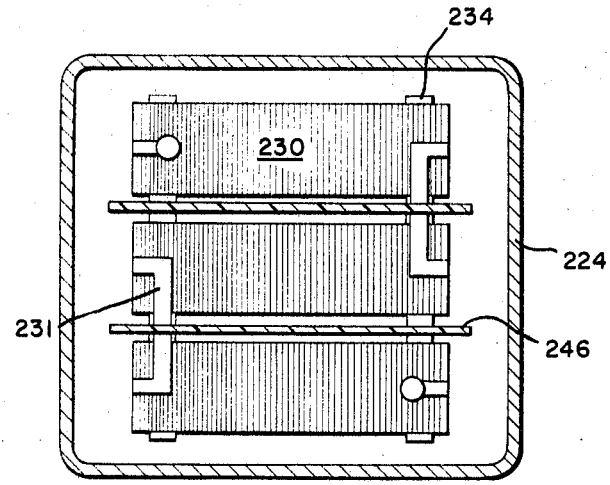
FIG. 9 is a bottom view of a battery including a plurality of interconnected cells, being formed by the process of the present invention.

In FIG. 9 there is shown a bottom view of apparatus during a step in the forming of a container about an interconnected plurality of cells, to produce an electric storage battery. A plurality of plate assemblies 230 comprising individual cells are interconnected by terminal bars 231. Spacer members 234 support plastic partitions 246 to separate the plate assemblies 230. The entire assembly is positioned within the mold and supported by battery terminals 232 extending from the bottom of the mold; a parison 224 is lowered about the assembly prior to the closing of the mold parts.

Figure 10:
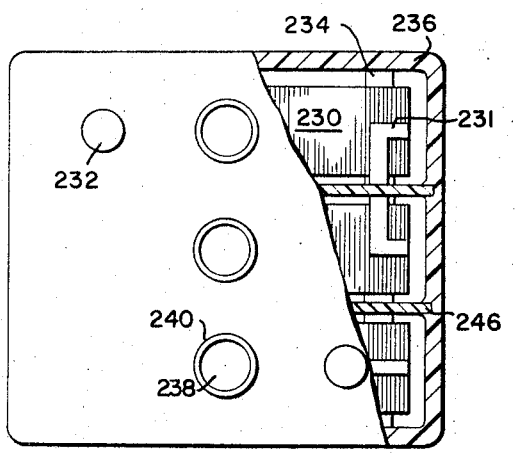
FIG. 10 is a top view of an alternative embodiment of an electric storage battery produced by the process of the present invention, shown partly with the top portion of the case removed.
Figure 11:
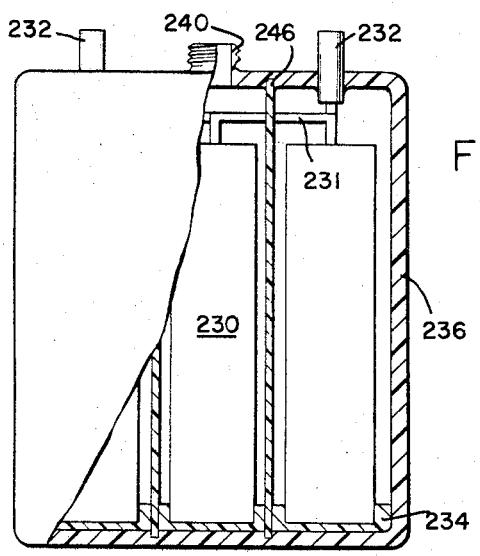
FIG. 11 is a front view of the electric storage battery of FIG. 10, shown partly with the front portion of its case removed.

Upon completion of the process as applied to the assemblage described in FIG. 9, the product produced is an electric storage battery as shown in FIGS. 10 and 11. The positive and negative terminals 232 protrude from a battery case 236, while the terminal bars 231 connect the individual plate assemblies 230 within the interior of the case. Depending upon the application, it is a matter of choice whether the cells are connected serially or in parallel. The plastic partitions 246 separate the plate assemblies 230 from each other, and the edges of the partitions 246 are welded to the walls of the container 236 during the blow molding process.

An aperture 238, surrounded by an extension 240 of the case 236, is provided for each cell of the battery, allowing three blow pins to be used during the forming process, and, in the finished battery is used for the introduction of the electrolyte liquid.

Thus, there has been shown a process for blow molding a container or case about an object so that object and container are integral parts of a single product, and several embodiments of a product which may be produced by practicing the process. Although the product described involves a battery, it is to be expressly understood that other products may be produced by the process. Furthermore, other embodiments of products concerning a battery and modifications of the embodiments herein presented may be developed without departing from the essential characteristics thereof.

Accordingly, the invention should be limited only by the scope of the claim appended below.

What is claimed as new is:

1. The method of producing an electric battery case containing a plurality of electric battery cells located therein, comprising the steps of:
   (a) supporting a plurality of battery plate assemblies provided with spacer members and plastic partitions to separate said assemblies into a plurality of interconnected electric battery cells within a mold having a cavity;
   (b) surrounding said plurality of cells with a length of hot deformable plastic tubing;
   (c) closing said mold about said plurality of cells forming a welded bond between said partitions and said tubing, enclosing said tubing within said mold cavity;
   (d) blowing said tubing to conform to the shape of said mold cavity by admitting a blowing fluid into said mold cavity between said plurality of cells and said tubing; and
   (e) opening said mold and removing said electric battery case containing said plurality of electric battery cells.

References Cited

UNITED STATES PATENTS

| | | | |
|---|---|---|---|
| 2,968,686 | 1/1961 | Duddy | 136—166 XR |
| 3,235,412 | 2/1966 | Shannon | 136—170 |
| 3,281,283 | 10/1966 | Ralph | 136—176 |

WINSTON A. DOUGLAS, *Primary Examiner.*

DONALD L. WALTON, *Assistant Examiner.*

U.S. Cl. X.R.

136—166; 264—94